United States Patent
Yakobov et al.

(10) Patent No.: US 10,745,110 B2
(45) Date of Patent: Aug. 18, 2020

(54) PROPELLER BLADE SYNCHROPHASING USING PHONIC WHEEL

(71) Applicant: PRATT & WHITNEY CANADA CORP., Longueuil (CA)

(72) Inventors: Ella Yakobov, Montreal (CA); James R. Jarvo, Saint Bruno (CA); Roja Tabar, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 225 days.

(21) Appl. No.: 16/024,678

(22) Filed: Jun. 29, 2018

(65) Prior Publication Data

US 2020/0001978 A1 Jan. 2, 2020

(51) Int. Cl.
*B64C 11/30* (2006.01)
*F02C 9/22* (2006.01)
*F02C 6/20* (2006.01)

(52) U.S. Cl.
CPC .............. *B64C 11/301* (2013.01); *F02C 9/22* (2013.01); *F02C 6/20* (2013.01); *F05D 2260/70* (2013.01); *F05D 2260/96* (2013.01); *F05D 2270/304* (2013.01); *F05D 2270/804* (2013.01)

(58) Field of Classification Search
CPC .... B64C 11/30; F02C 9/22; F02C 6/20; F02C 2260/70; F02C 2260/96
USPC ............................................................ 701/3
See application file for complete search history.

(56) References Cited

U.S. PATENT DOCUMENTS

| | | | |
|---|---|---|---|
| 2,887,621 A | 5/1959 | Wilde, Jr. | |
| 3,589,832 A | 6/1971 | Harris et al. | |
| 3,636,364 A | 1/1972 | Stempler et al. | |
| 4,900,226 A | 2/1990 | De Vries | |
| 4,934,825 A | 6/1990 | Martin | |
| 5,058,376 A * | 10/1991 | Snow | B64D 31/12 60/204 |
| 5,093,791 A * | 3/1992 | Schneider | H02P 5/56 416/34 |
| 5,170,365 A | 12/1992 | Collopy et al. | |
| 6,782,766 B2 | 8/2004 | Parkinson | |

(Continued)

FOREIGN PATENT DOCUMENTS

EP 0353076 1/1990
EP 3284665 2/2018

*Primary Examiner* — Tan Q Nguyen
(74) *Attorney, Agent, or Firm* — Norton Rose Fulbright Canada LLP (57) ABSTRACT

Herein provided are systems and methods for synchrophasing multi-engine aircraft. A phonic wheel is coupled to a first propeller of a first engine of the aircraft. A sensor is disposed and configured for producing a signal in response to passage of first and second position markers on the phonic wheel. A control system is communicatively coupled to the sensor for obtaining the signal, and configured for: determining an expected delay between two subsequent signal pulses of the signal; identifying from within the plurality of signal pulses a particular pulse associated with the second position marker; determining, based on a particular time at which the particular pulse associated with the second position marker was produced, that a rotational position of the first propeller corresponds to a reference position at the particular time; and performing at least one synchrophasing operation for the aircraft based on the rotational position of the first propeller.

20 Claims, 7 Drawing Sheets

(56) References Cited

U.S. PATENT DOCUMENTS

| | | |
|---|---|---|
| 9,383,385 B2 | 7/2016 | Day et al. |
| 9,821,901 B2 | 11/2017 | Duke et al. |
| 2011/0198440 A1* | 8/2011 | Saucray ................ B64D 31/12 244/69 |
| 2016/0010589 A1* | 1/2016 | Rolt ...................... F01D 13/003 60/226.1 |
| 2016/0376912 A1 | 12/2016 | Prentice |
| 2018/0050789 A1 | 2/2018 | Marone et al. |
| 2018/0050816 A1 | 2/2018 | Yakobov et al. |

* cited by examiner

PROPELLER BLADE SYNCHROPHASING USING PHONIC WHEEL

TECHNICAL FIELD

The present disclosure relates generally to engines, and more specifically to propeller control systems for gas turbine engines.

BACKGROUND OF THE ART

Certain types of phonic wheels can be used to provide information regarding the relative phase of propellers of turboprop engines, usually by removing one of the markers, creating a "missing tooth" which can be detected, or by adding an additional marker which is distinguishable from the other markers. Knowledge of the relative phase of the propellers can be used to perform synchrophasing, a technique used to reduce vibrations and noise experienced by passengers of the aircraft. However, synchrophasing techniques based on missing teeth tend to be inaccurate, and can require additional equipment to function correctly.

Therefore, improvements are needed.

SUMMARY

In accordance with a broad aspect, there is provided a system for synchrophasing a multi-engine aircraft, comprising: a phonic wheel coupled to a first propeller of a first engine of the aircraft, the phonic wheel comprising a plurality of circumferentially uniformly-spaced first position markers disposed on an outer circumferential surface of the phonic wheel and a second position marker disposed on the outer surface, the second position marker disposed circumferentially closer to a selected one of the first position markers than to the remaining first position markers and being indicative of a reference position of the propeller, the phonic wheel configured to rotate during operation of the first engine; a sensor adjacent the phonic wheel and configured for producing a signal in response to passage of the first position markers and the second position marker, the signal comprising a plurality of signal pulses corresponding to the passage of the plurality of first position markers and of the second position marker during rotation of the phonic wheel; and a control system communicatively coupled to the sensor for obtaining the signal, and configured for: determining, based on the plurality of signal pulses, an expected delay between two subsequent pulses of the plurality of signal pulses, the expected delay representative of the spacing of the plurality of first position markers; identifying from within the plurality of signal pulses a particular pulse associated with the second position marker, the particular pulse having a delay shorter than the expected delay; determining, based on a particular time at which the particular pulse associated with the second position marker was produced, that a rotational position of the first propeller corresponds to the reference position at the particular time; and performing at least one synchrophasing operation for the aircraft based on the rotational position of the first propeller.

In some embodiments, the control system being configured for performing at least one synchrophasing operation comprises: transmitting a position signal, indicative of the rotational position of the first propeller, to a central control of the aircraft; obtaining, from the central control, an engine control signal generated by the central control based on the position signal, the engine control signal comprising instructions for causing a predetermined operating parameter of at least one of the first engine and the first propeller to be adjusted to maintain a predetermined phase angle for the first propeller; and adjusting, based on the engine control signal, at least one operating parameter of the at least one of the first engine and the first propeller.

In some embodiments, transmitting the position signal, indicative of the rotational position of the first propeller, to the central control of the aircraft further causes the central control to generate, based on the position signal, instructions for causing a predetermined operating parameter of at least one of a second engine and a second propeller of the aircraft to be adjusted to maintain a predetermined phase angle difference between the first propeller and the second propeller.

In some embodiments, the control system is a first control system, wherein the first control system being configured for performing at least one synchrophasing operation comprises: transmitting a position signal to a second control system associated with a second propeller of the aircraft; obtaining, from the second control system, an engine control signal generated by the second control system based on the position signal, the engine control signal comprising instructions for causing a predetermined operating parameter of at least one of the first engine and the first propeller to be adjusted to maintain a predetermined phase angle for the first propeller; and adjusting, based on the engine control signal, the predetermined operating parameter of the at least one of the first engine and the first propeller.

In some embodiments, transmitting the position signal, indicative of the rotational position of the first propeller, to the second control system further causes the second control system to generate, based on the position signal, instructions for causing a predetermined operating parameter of at least one of a second engine and a second propeller of the aircraft to be adjusted to maintain a predetermined phase angle difference between the first propeller and the second propeller.

In some embodiments, the control system is further configured for: obtaining at least one position signal from at least one supplementary control system, each of the at least one supplementary control system associated with a respective supplementary engine and supplementary propeller of the aircraft and each of the at least one position signal indicative of a rotational position of the respective supplementary propeller of the aircraft; generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and transmitting each of the at least one engine control signal to the respective supplementary control system.

In some embodiments, the control system is further configured for: obtaining at least one position signal from at least one supplementary control system, each of the at least one supplementary control system associated with a respective supplementary engine and supplementary propeller of the aircraft and each of the at least one position signals indicative of a rotational position of the respective supplementary propeller of the aircraft; and adjusting a predetermined operating parameter of at least one of the first engine and the first propeller to maintain a predetermined phase angle difference between the first propeller and the at least one supplementary propeller.

In some embodiments, the control system is further configured for: generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and transmitting each of the at least one engine control signal to the respective supplementary control system.

In some embodiments, the at least one synchrophasing operation comprises at least one of adjusting a speed of rotation of the first engine, a speed of rotation of the first propeller, and a pitch of the first propeller.

In some embodiments, the second position marker is angled with respect to the first position markers.

In accordance with another broad aspect, there is provided A method for performing synchrophasing in a multi-engine aircraft, comprising: obtaining a signal, comprising a plurality of signal pulses, from a sensor adjacent a phonic wheel, the plurality of signal pulses produced in response to sensing a presence of position markers disposed on an outer surface of the phonic wheel coupled to a first propeller of a first engine of the aircraft, the phonic wheel configured to rotate during operation of the first engine; determining, based on the plurality of signal pulses, an expected delay between two subsequent signal pulses of the plurality of signal pulses, the expected delay representative of a spacing of a first plurality of the position markers; identifying, within the plurality of signal pulses and based on the expected delay, a particular pulse associated with a second one of the position markers; determining, based on a particular time at which the particular pulse associated with the second position marker was produced, that a rotational position of the first propeller corresponds to a reference position of the first propeller associated with the second position marker at the particular time; and performing at least one synchrophasing operation for the engine based on the rotational position of the first propeller.

In some embodiments, performing at least one synchrophasing operation comprises: transmitting a position signal, indicative of the rotational position of the first propeller, to a central control of the aircraft; obtaining, from the central control, an engine control signal generated by the central control based on the position signal, the engine control signal comprising instructions for causing a predetermined operating parameter of at least one of the first engine and the first propeller to be adjusted to maintain a predetermined phase angle for the first propeller; and adjusting, based on the engine control signal, at least one operating parameter of the at least one of the first engine and the first propeller.

In some embodiments, transmitting the position signal, indicative of the rotational position of the first propeller, to the central control of the aircraft further causes the central control to generate, based on the position signal, instructions for causing a predetermined operating parameter of at least one of a second engine and a second propeller of the aircraft to be adjusted to maintain a predetermined phase angle difference between the first propeller and the second propeller.

In some embodiments, performing at least one synchrophasing operation comprises: transmitting a position signal to a second control system associated with a second propeller of the aircraft; obtaining, from the second control system, an engine control signal generated by the second control system based on the position signal, the engine control signal comprising instructions for causing a predetermined operating parameter of at least one of the first engine and the first propeller to be adjusted to maintain a predetermined phase angle for the first propeller; and adjusting, based on the engine control signal, the predetermined operating parameter of the at least one of the first engine and the first propeller.

In some embodiments, transmitting the position signal, indicative of the rotational position of the first propeller, to the second control system further causes the second control system to generate, based on the position signal, instructions for causing a predetermined operating parameter of at least one of a second engine and a second propeller of the aircraft to be adjusted to maintain a predetermined phase angle difference between the first propeller and the second propeller.

In some embodiments, the method further comprises: obtaining at least one position signal from at least one supplementary control system, each of the at least one supplementary control system associated with a respective supplementary engine and supplementary propeller of the aircraft and each of the at least one position signal indicative of a rotational position of the respective supplementary propeller of the aircraft; generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and transmitting each of the at least one engine control signal to the respective supplementary control system.

In some embodiments, the method further comprises: obtaining at least one position signal from at least one supplementary control system, each of the at least one supplementary control system associated with a respective supplementary engine and supplementary propeller of the aircraft and each of the at least one position signals indicative of a rotational position of the respective supplementary propeller of the aircraft; and adjusting a predetermined operating parameter of at least one of the first engine and the first propeller to maintain a predetermined phase angle difference between the first propeller and the at least one supplementary propeller.

In some embodiments, the method further comprises: generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and transmitting each of the at least one engine control signal to the respective supplementary control system.

In some embodiments, performing the at least one synchrophasing operation comprises performing at least one of adjusting a speed of rotation of the first engine, a speed of rotation of the first propeller, and a pitch of the first propeller.

In some embodiments, the second position marker is angled with respect to the position markers of the first plurality of position markers.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
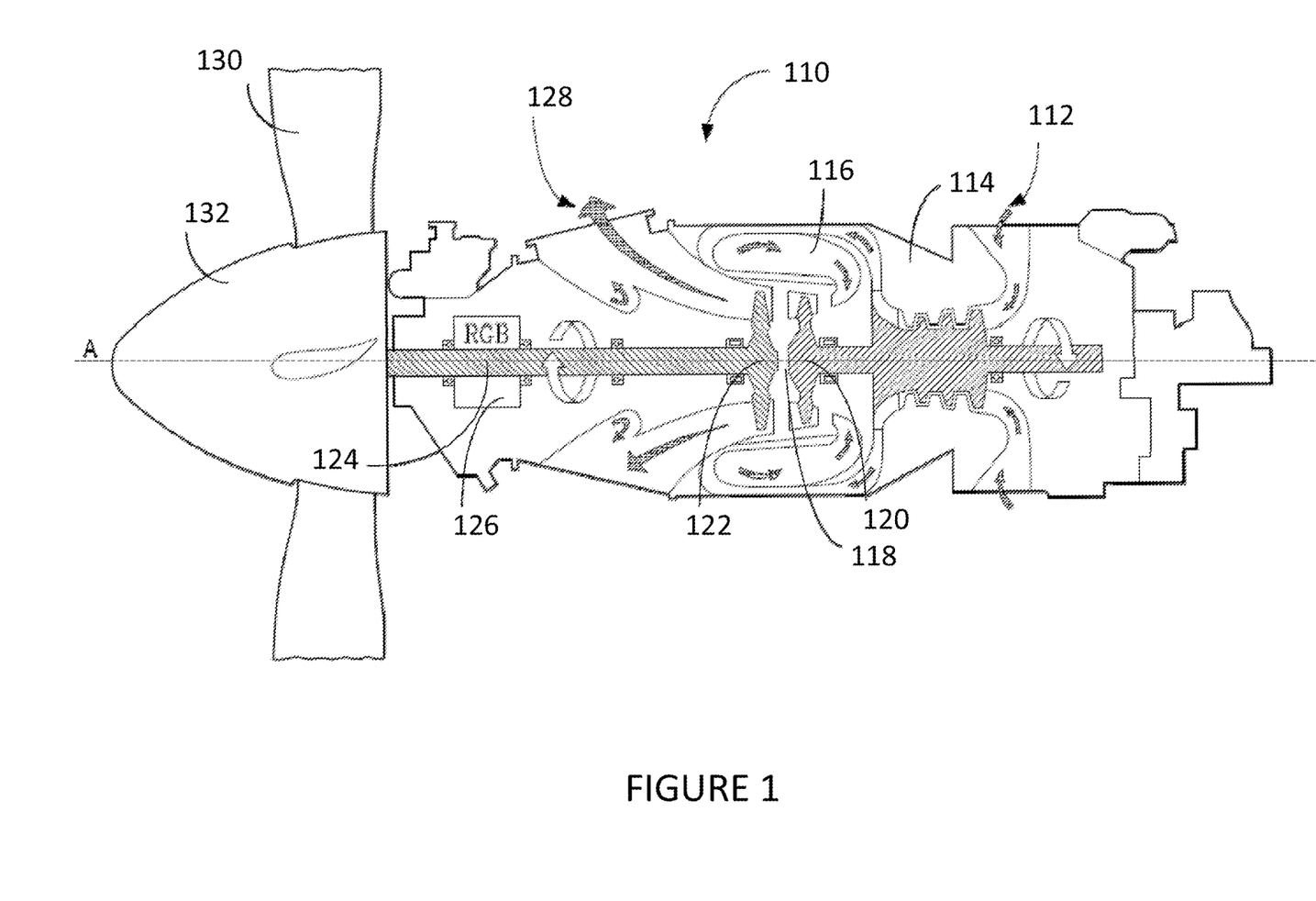
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 20 and rotatingly drives a rotor shaft 124 about a propeller shaft axis 'A' through a reduction gearbox 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
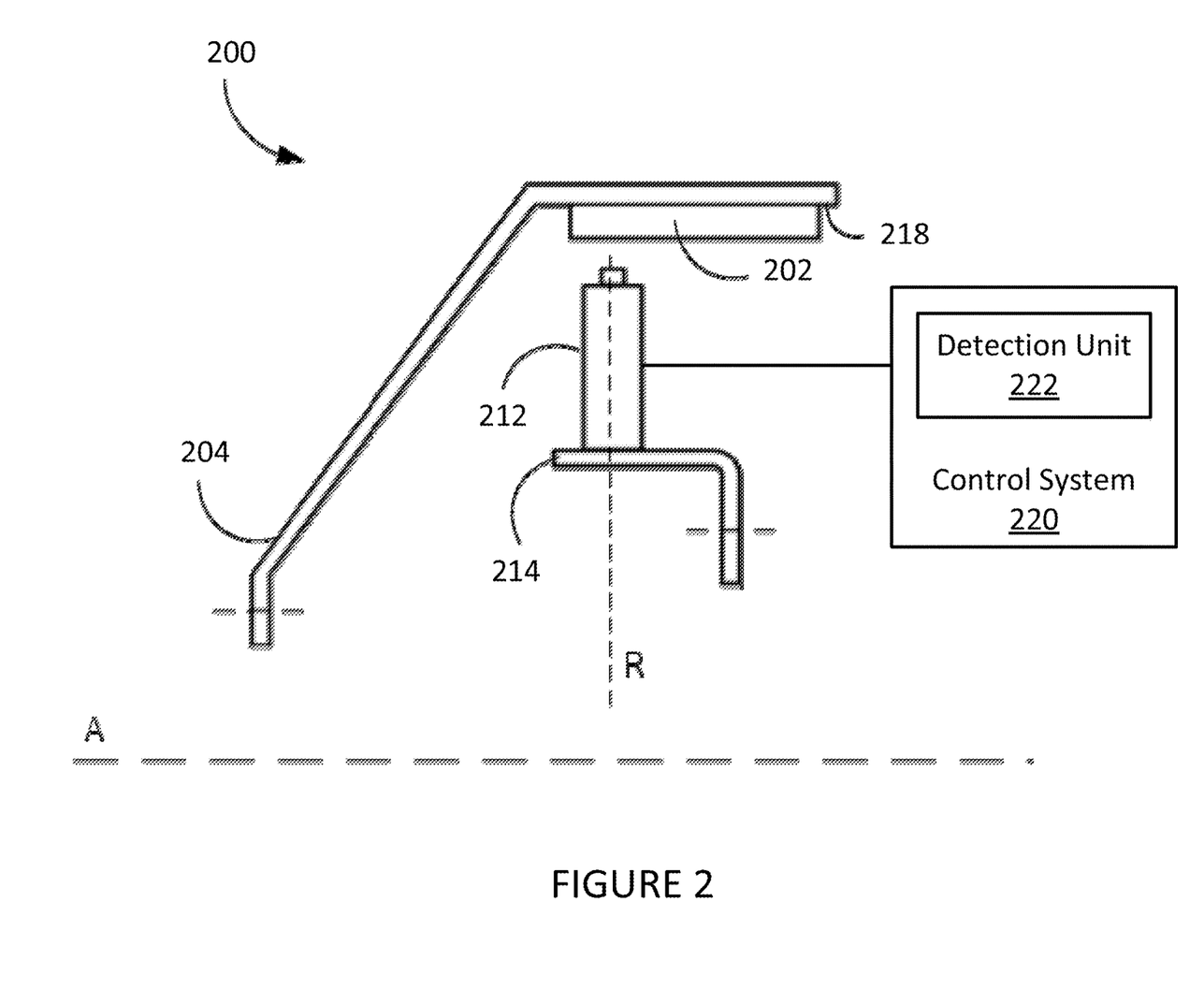
FIG. 2 is a schematic diagram of an example system for sensing a phonic wheel.

With reference to FIG. 2, a system 200 for sensing a phonic wheel 204 will now be described. In some embodiments, the system 200 provides for detection and measurement of rotational velocity of the propeller and of propeller blade angle on propeller systems. The system 200 may interface to existing mechanical interfaces of typical propeller systems to provide a digital detection for electronic determination of the propeller blade angle. It should be noted that although the present disclosure focuses on the use of the system 200 and the phonic wheel 204 in gas-turbine engines, similar techniques can be applied to other types of engines, including electric engines.

The system 200 comprises an annular member 204 and one or more sensors 212 positioned proximate the annular member 204. Annular member 204 (referred to herein as a phonic wheel) has a plurality of position markers 202 disposed thereon for detection by sensor 212. In some embodiments, the phonic wheel 204 is mounted for rotation with propeller 130 and to move axially with adjustment of the blade angle of the blades of the propeller 130, and the sensor 212 is fixedly mounted to a static portion of the engine 110 and/or the propeller 130. In other embodiments, the sensor 212 is mounted for rotation with propeller 130 and to move axially with adjustment of the blade angle of the blades of the propeller 130, and the phonic wheel 204 is fixedly mounted to a static portion of the engine 110 and/or the propeller 130.

The system 200 also includes a control system 220 communicatively coupled to the sensor 212. The sensor 212 is configured for producing an electrical signal which is transmitted to or otherwise received by the control system 220, for example via a detection unit 222 thereof. In some embodiments, the sensor 212 produces a series of electrical pulses in response to detecting the presence of a position marker 202 in a sensing zone of the sensor 212. For example, the sensor 212 operates on detecting changes in magnetic flux, and has a sensing zone which encompasses a circular or rectangular area or volume in front of the sensor 212. When a position marker 202 is present in the zone, or passes through the zone during rotation of the phonic wheel 204, the magnetic flux in the sensing zone is varied by the presence of the position marker 202, and the sensor 212 can produce an electrical pulse, which forms part of the electrical signal.

Figure 3:
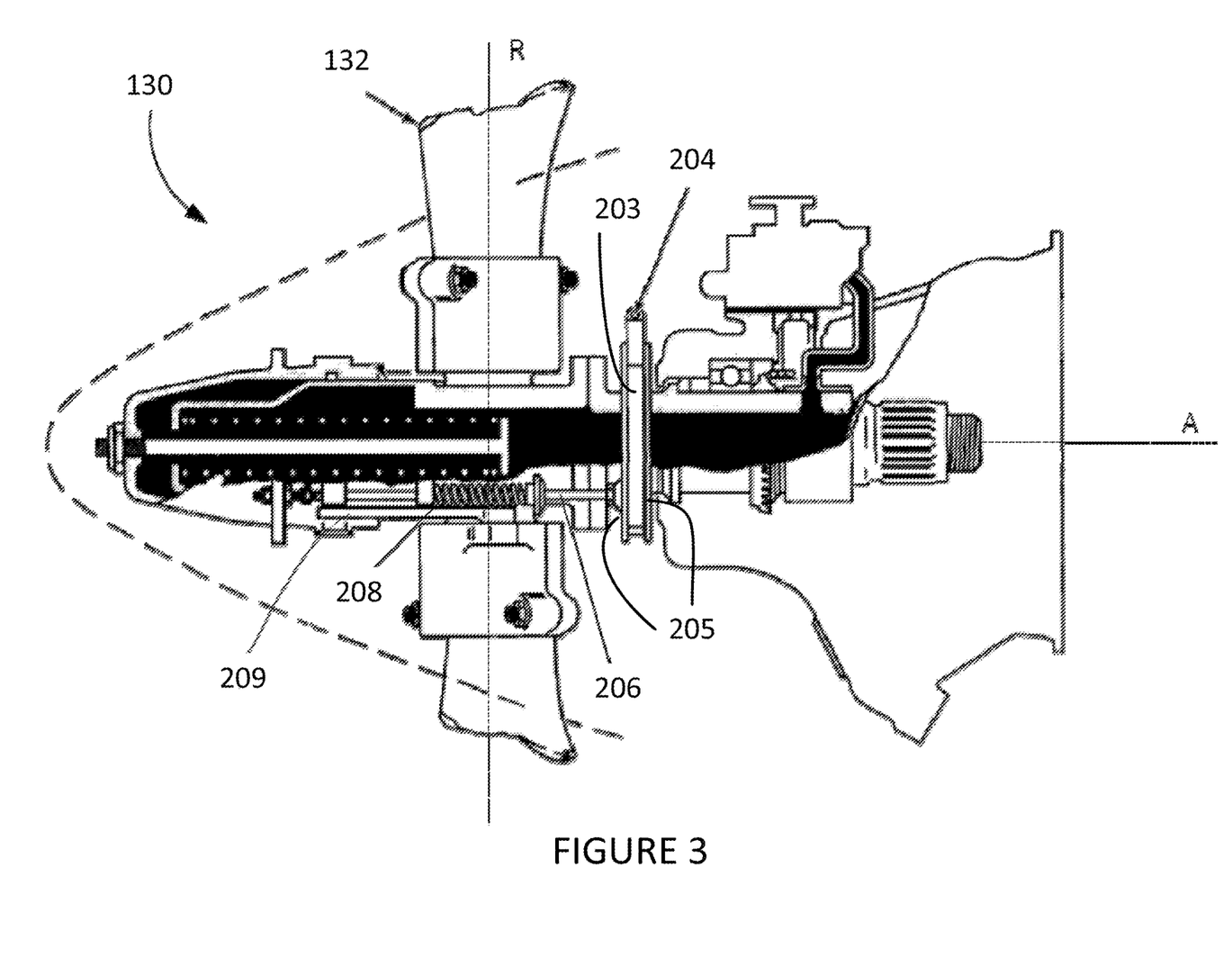
FIG. 3 is a schematic diagram of the propeller of FIG. 1 with the phonic wheel of FIG. 2, in accordance with an embodiment.

In the example illustrated in FIG. 3, a side view of a portion of phonic wheel 104 and sensor 212 is shown. The sensor 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 3 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the phonic wheel 204 and the position markers 202. In some other embodiments, in order to provide redundancy, one or more additional sensors, which may be similar to the sensor 212, are provided. For example, an additional sensor 212 may be mounted in a diametrically opposite relationship relative to the position markers 202, which extend away from the phonic wheel 204 and towards the sensor(s) 212. In yet another embodiment, several position markers 102 may be spaced equiangularly about the perimeter of the phonic wheel 104. Other embodiments may apply.

Figure 4:
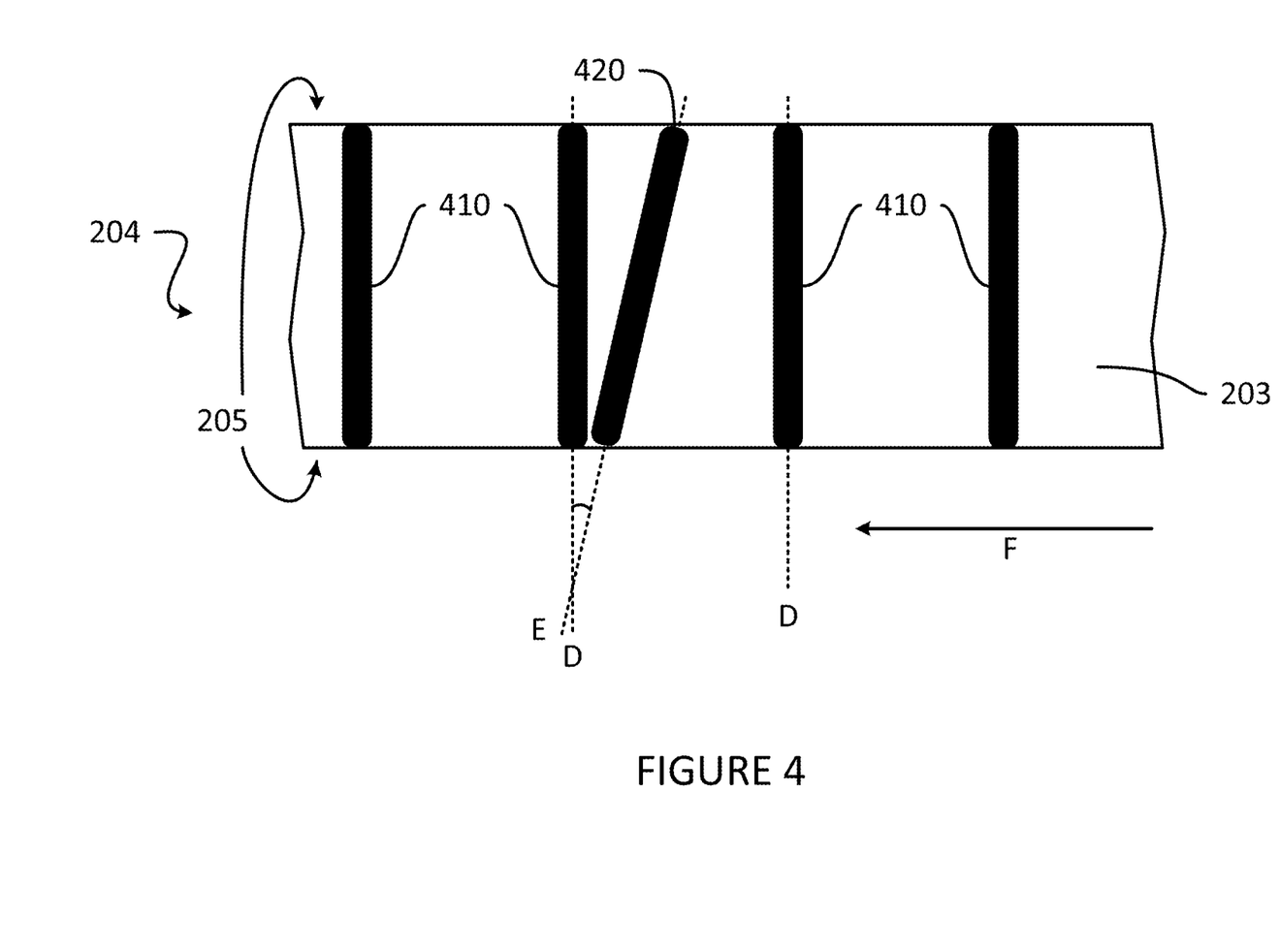
FIG. 4 is a schematic top view of an embodiment of the phonic wheel of FIG. 2.

With reference to FIG. 3, in some embodiments the phonic wheel 204 is embodied as a circular disk which rotates as part of the engine 110, for example with the output shaft 124 or with the propeller 130. The phonic wheel 204 comprises opposing faces 205 and defines a root surface 203 which extends between the opposing faces 205 and circumscribes them. Put differently, the root surface 203 of the phonic wheel 204 is the outer periphery of the circular disk which spans between the two opposing faces 205. In these embodiments, the position markers 202 can take the form of projections which extend from the root surface 203, as illustrated in FIG. 4 and discussed in greater detail hereinbelow. It should be noted, however, that other embodiments are also considered.

In some embodiments, the position markers can be applied to the root surface 203, for instance as strips of metal or other material for detection by the sensor 212, which can be a magnetic flux sensor. In some other embodiments, the position markers can be coloured or contrasting bands of material applied to the root surface 203 for detection by the sensor 212, which can be an optical sensor. Still other embodiments are considered.

With continued reference to FIG. 3, the phonic wheel 204 is supported for rotation with the propeller 30, which rotates about the longitudinal axis 'A'. The phonic wheel 204 is also supported for longitudinal sliding movement along the axis A, e.g. by support members, such as a series of circumferentially spaced beta feedback rods 206 that extend along the longitudinal axis 'A'. A compression spring 208 surrounds an end portion of each rod 206.

As depicted in FIG. 3, the propeller 130 comprises a plurality of angularly arranged blades 132, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

With reference to FIG. 4, an embodiment of the phonic wheel 204 is illustrated. As discussed hereinabove, the phonic wheel 204 comprises the position markers 202, which can take the form of projections which extend from the root surface 203. As the phonic wheel 204 rotates, varying portions thereof enter, pass through, then exit the sensing zone of the sensor 212. From the perspective of the sensor 212, the phonic wheel moves along direction 'F' as the phonic wheel rotates.

In FIG. 4, a top-view of a portion of the phonic wheel 204 is shown. In the illustrated embodiment, the position markers 202 include a plurality of projections 410 which are arranged along direction 'E', which is substantially transverse to the opposing faces 205. Although only four projections 410 are illustrated in FIG. 4, it should be understood that any suitable number of projections 410 may be present across the whole of the root surface 203. The projections 410 can be substantially equally spaced from one another on the root surface 203. In addition, the projections 410 are of substantially a common shape and size, for example having a common volumetric size.

The phonic wheel 204 also includes at least one supplementary projection 420 which is positioned between two adjacent ones of the projections 410. The projection 420 can be used as an indication of a reference position of the rotational position of the propeller 130, as is discussed in greater detail hereinbelow.

In the embodiment depicted in FIG. 4, the projection 420 is oriented along direction which is at an angle relative to direction 'E'. The angle between directions 'D' and 'E' can be any suitable value between 1° and 89°, for example 30°, 45°, 60°, or any other value, as appropriate. It should be noted, however, that in some other embodiments the supplementary projection 420 can be co-oriented with the projections 410, for instance along direction 'E'. It should also be noted that in some embodiments, the projection 420 can be substituted for a groove or inward projection, as appropriate.

In some embodiments, the phonic wheel 204 includes only a single supplementary projection 420; in other embodiments, the phonic wheel 204 can include two, three, four, or more supplementary projections 420. In embodiments in which the phonic wheel 204 includes more than one supplementary projections 420, the supplementary projections can be oriented along a common orientation, for instance direction 'ID', or can be oriented along one or more different orientations. The projection 420 can be located at substantially a midpoint between two adjacent projections 410, or can be located close to a particular one of two adjacent projections 410, as illustrated in FIG. 4.

In one example, the phonic wheel 204 includes a plurality of pairs of projections 410, for instance eight, and within each pair is a first tooth oriented along direction E and a second tooth angled with respect thereto, for instance oriented along direction D. The supplementary projection 420 can be oriented in any suitable way, including along direction E, direction D, or another alternative direction, for example at an angle complementary or supplementary to D.

Although the preceding paragraphs focus on the use of the sensor 212 which detects changes in magnetic flux due to the presence of one of the projections 410, 420 in the sensing zone of the sensor, it should be understood that other types of sensors are also considered. For instance, an optical sensor which detects reflectivity of light off of position markers 202 can be used, and in this case the projections 420 can have a physical configuration which increases the reflectivity of the projections 420. In another example, an acoustic sensor which performs detection of position markers 202 using echoed sound waves can be used, and in this case the projections 420 can have a physical configuration which increases the degree to which incoming sound waves are reflected toward the acoustic sensor. Still other embodiments are considered.

The signal pulses produced by the sensor 212, which form part of the electrical signal received by the control system 220, can be used to determine various operating parameters of the engine 110 and the propeller 130. The regular spacing of the projections 410 can be used to determine a speed of rotation of the phonic wheel 204. In addition, the projection 420 can be detected by the sensor 212 to determine a phase of the propeller 130.

Figure 5:
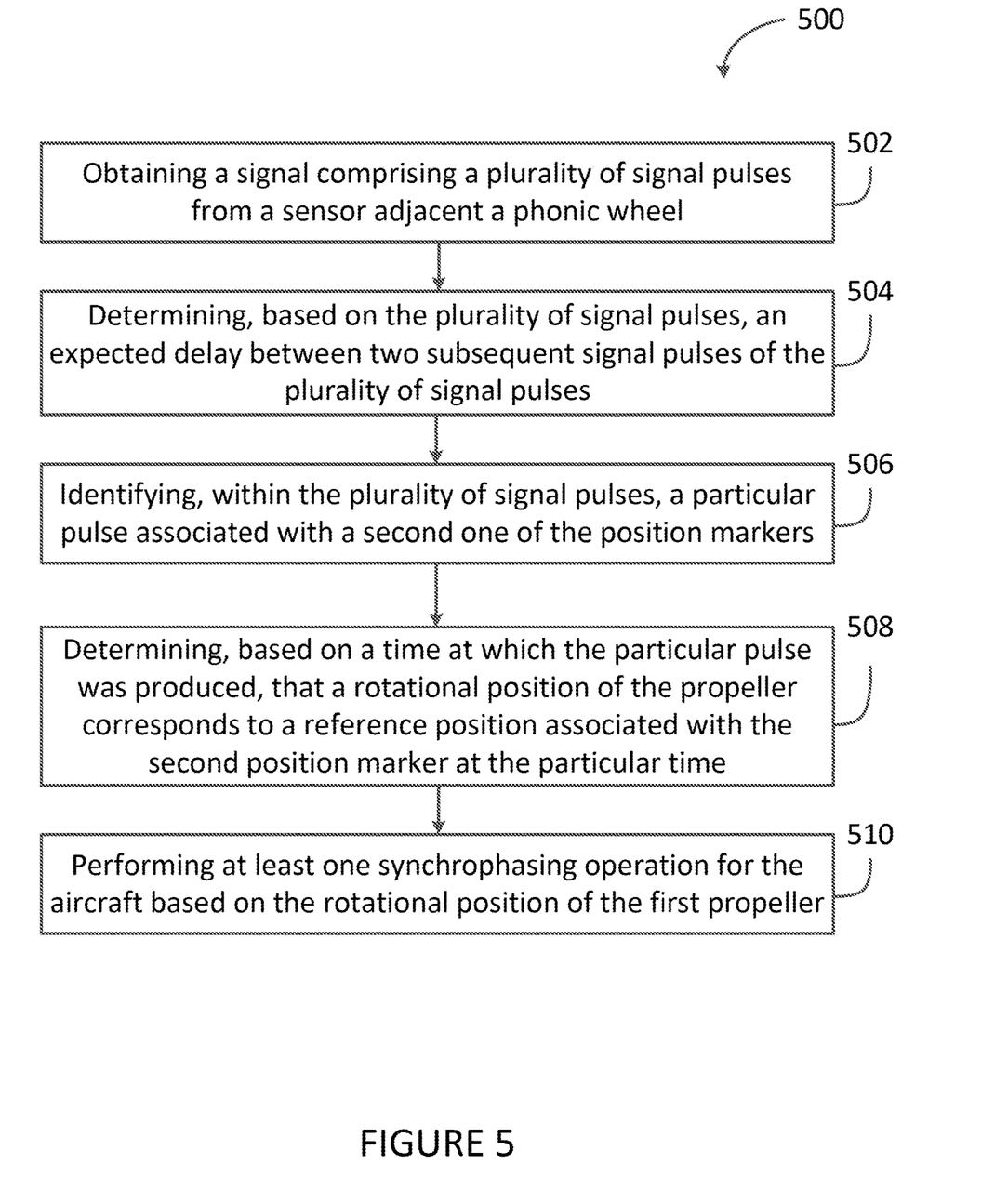
FIG. 5 is flowchart of an example method for monitoring vibration in an engine.

With reference to FIG. 5, there is illustrated a method 500 for performing synchrophasing in a multi-engine aircraft, for example the aircraft of which the engine 110 and the propeller 130 are a part. At step 502, a signal comprising a plurality of signal pulses is obtained from a sensor, for example the sensor 212. The signal can be an electrical signal, digital or analog, an optical signal, or any other suitable type of signal. The signal pulses are produced in response to the sensor 212 sensing position markers disposed on an outer surface of a phonic wheel, for example the projections 410, 420 of the phonic wheel 204. Other embodiments for the position markers are also considered. The phonic wheel is contained within a first engine of the aircraft, for example the engine 110, and the phonic wheel is configured to rotate during operation of the engine 110, for example along with the propeller 130.

At step 504, an expected delay between two subsequent pulses of the plurality of signal pulses is determined. The expected delay can be determined based on the plurality of signal pulses, and is generally representative of the spacing of the projections 410 on the phonic wheel 204. Put differently, the expected delay is indicative of an amount of time between the sensor 212 detecting two subsequent ones of the projections 410. In some embodiments, the delay is associated with a mark-space ratio of the signal pulses produced by the sensor 212.

For example, a portion of the signal produced by the sensor 212 over a certain period of time can be obtained and an average duration between signal pulses can be used to determine the expected delay. In another example, the delay between multiple, randomly-selected subsequent signal pulses can be averaged to determine the expected delay. Still other approaches are considered.

At step 506, a particular signal pulse having a delay shorter than the expected delay is identified based on the expected delay. As understood herein, a particular signal pulse having a delay can refer to the delay between a previous pulse and a given pulse or the delay between a given pulse and a subsequent pulse, as appropriate. When the delay for a particular signal pulse is found to be shorter than the expected delay, for example beyond a particular range for the expected delay, or below a particular threshold, the particular pulse is identified.

In the case of the example phonic wheel 204 of FIG. 4, the delay between the projection 420 and the projection 410 to the left thereof (as illustrated in FIG. 4) will be shorter than the expected delay, i.e., the delay between two adjacent projections 410. In addition, the delay between the projection 420 and the projection 410 to the right thereof (as illustrated in FIG. 4) will be shorter than the expected delay. Thus, irrespective of how the delay for the projection 420 is determined, the signal pulse caused by the projection 420 will be identified as the "particular signal pulse". This allows the sensor 212 and/or the control system 200 to identify the location of the projection 420 along the phonic wheel 204.

At step 508, a rotational position of the propeller 130 can be determined based on a time at which the particular pulse identified at step 506 was produced by the sensor 212. The rotational position of the propeller 130 is an indication of the position of one or more of the blades of the propeller 130. For example, the rotational position of the propeller can be defined as the angular position of one of the blades of the propeller 130 relative to a particular reference position for the blade(s) of the propeller 130. For instance, the reference position is set at a vertical-up position, and when a particular blade of the propeller 130 is at the vertical-up position, the rotational position of the propeller 130 can be said to be at 0°. Other reference positions, and other schemes for expressing the rotational position of the propeller, can also be established.

Since the particular signal pulse is associated with the projection 420, the projection 420 can serve as a reference position for the phonic wheel 204. When the particular pulse is identified, the rotational position of the propeller is determined to correspond to the reference position. For example, if the reference position is taken to be a 0° position, when the particular signal pulse is detected, it can be determined that the propeller 130 is at the 0° position. In other examples, the particular signal pulse can indicate that the rotational position of the propeller is at a starting or initial position, or as being at any other suitable position. In this fashion, the rotational position of the propeller 130 can be determined based on the identification of the particular pulse.

In some embodiments, when the projection 420 is detected, a time of detection can be registered and compared against a reference value, and any deviation from the reference value can be used to determine a phase of the propeller 130, with respect to the reference value. The phase of the propeller 130 is an indication of the relative angular position of one or more of the blades of the propeller 130 with respect to the reference value. For instance, if the projection 420 is detected 1 millisecond later than the reference value, the phase of the propeller 130 can be determined by the product of the 1 millisecond time delay and the rotational speed to obtain a fraction of revolution, or an angle, of the blade(s) of the propeller 130 relative to the reference value. This angle, known as the phase angle, indicates the degree of angular separation between the blades of the propeller 130 and the reference value. In some embodiments, the reference value is based on the rotation of a separate propeller, and the phase of the propeller 130 is an indication of the degree of angular separation between the blades of the propeller 130 and the blades of the separate propeller.

Other approaches for determining the phase of the propeller 130 are also considered. For instance, the projection 420 can be indicative of a reference phase value for the propeller 130 (such as a 0° position), and the time at which the projection 420 is detected can be compared to other times at which reference phase values for other propellers are detected, to determine relative phase values for the propeller 130 and other propellers.

At step 510, at least one synchrophasing operation for the aircraft is performed, based on the rotational position of the propeller 130. In some embodiments, an indication of the rotational position of the propeller 130, for example a position signal, and/or of the phase of the propeller 130, for example a phase signal, is sent to a central control unit, or to another control system associated with another engine and/or propeller of the aircraft, and the central control unit/control system is configured for causing changes in the operating parameters of the propeller 130 and/or of the other propeller(s) to perform synchrophasing. In other embodiments, a component of the engine 110 performing the method 500, for instance the control system 200, can receive position and/or phase signals from other propellers (or from control systems thereof) and the control system 200 can cause changes in the operating parameters of the propeller 130 and/or of the other propeller(s) to perform synchrophasing. Still other embodiments are considered.

As part of the synchrophasing operations of step 510, changes to the operating parameters of one or more propellers of the aircraft 100 can be performed. For example, the operating parameters of the propellers can be altered to control the relative phase of the propellers to ensure that the propellers remain out-of-phase by a predetermined optimal phase difference. Alternatively, or in addition, the operating parameters can be altered to control the relative phase of the propellers to ensure that the propellers avoid predetermined relative phase values.

Figure 6A:
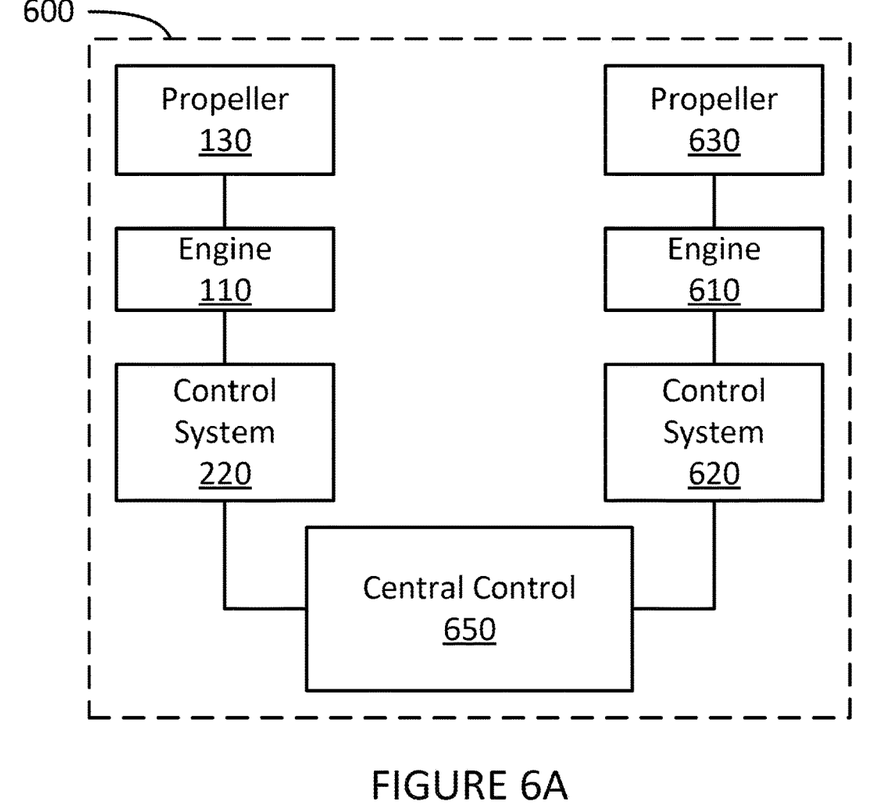
FIGS. 6A-B are block diagrams of example multi-engine aircraft.
Figure 6B:
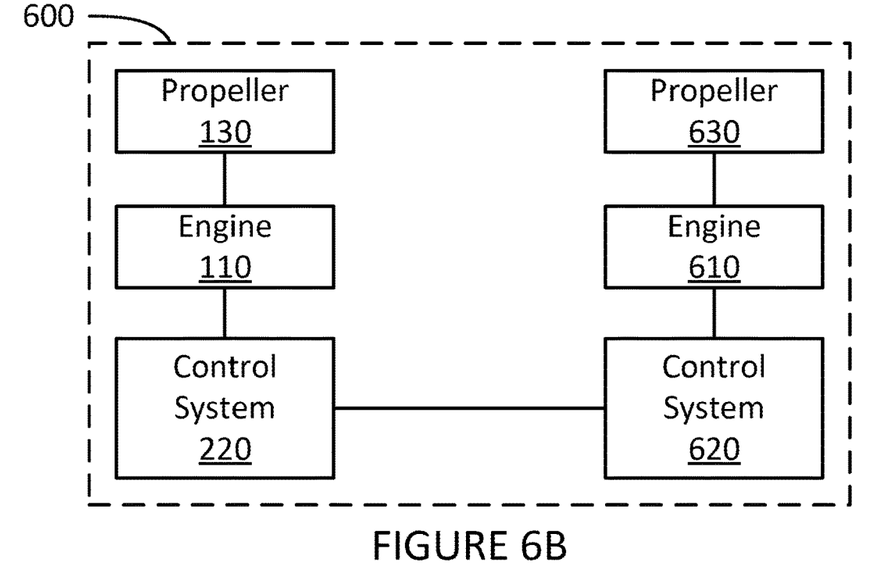

With reference to FIGS. 6A-B, different examples of synchrophasing operations for a multi-engine aircraft 600, performed within the context of step 510, are shown. In the embodiments of FIGS. 6A and 6B, the aircraft 600 has two engines 110, 610, each controlled by a control system, namely the control system 220 and a control system 620, respectively. The engine 110 is coupled to the propeller 130, and the engine 610 is coupled to the propeller 630. The control system 220 can be configured for implementing the method 500 to determine a rotational position and/or a phase for the propeller 130. Similarly, the control system 620 can be configured for implementing the method 500 to determine a rotational position and/or a phase for the propeller 630. The control systems 220, 620 then implement one or more synchrophasing operations.

In FIG. 6A, the aircraft 600 also has a central control 650 which is communicatively coupled to the control systems 220, 620. The central control 650 can be configured for monitoring information obtained by the control systems 220, 620, and can issue signals to the control systems 220, 620 with instructions for controlling or adjusting operation thereof, and/or for causing the control systems 220, 620 to control or adjust the operation of the propellers 130, 630, respectively.

In one example, the control system 220 can transmit a position and/or phase signal to the central control 650 which indicates the rotational position and/or phase of the propeller 130. The position and/or phase signal can be encoded in any suitable fashion, and can contain any suitable representation of the rotational position and/or phase of the propeller 130. For instance, the position signal can be a single signal pulse emitted substantially simultaneously with the detection, by the sensor 212, of the projection 420. Similarly, the control system 620 can transmit a position signal to the central control 650 which indicates the rotational position of the propeller 630. The central control 650 can then transmit engine control signals to the control systems 220, 620 which include instructions for adjusting operating parameters of the engines 110, 610 and/or the propellers 130, 630. The control systems 220, 620 receive the engine control signals and then adjust the operating parameters of the engines 110, 610 and/or of the propellers 130, 630.

The central control 650 can use the rotational positions and/or phases for the propellers 130, 630, to determine a level to which the propellers 130, 630 of the engines 110, 610 are in phase, or out of phase, and to determine necessary changes to the operating parameters of the engines 110, 610 and/or to the propellers 130, 630 to maintain or achieve synchrophasing for the propellers 130, 630. For example, if the propellers 130, 630 are out-of-phase with one another by a level that is above a predetermined threshold, the central control 650 can generate instructions for causing changes to the rotational velocity of one or both of the engines 110, 610 and/or of one or both of the propellers 130, 630, in the form of the aforementioned engine control signals, and transmit the engine control signals to the control systems 220, 620. In other examples, the central control 650 can generate instructions for causing changes to other operating parameters of the engine 110, the engine 610, the propeller 130, and/or the propeller 630 for example a propeller blade angle, a propeller pitch, a torque, an output power, and the like.

In FIG. 6B, the control system 220 and the control system 620 are communicatively coupled to one another and are configured for sharing information regarding the rotational position and/or phase of the propellers 130, 630. The control system 220, or the control system 620, can also be configured for issuing signals to the other one of the control systems 220, 620 with instructions for controlling or adjusting operation thereof, and/or for causing the other one of the control systems 220, 620 to control or adjust the operation of the engines 110, 610 and/or the propellers 130, 630, respectively.

In one example, the control system 220 transmits a position signal to the control system 620. The control system 620 can use the rotational position of the propeller 130, obtained from the position signal, and the rotational position for the propeller 630, which was determined by the control system 620, to determine a level to which the propellers 130, 630 of the engines 110, 610 are in phase, or out of phase. For instance, a time delay between receipt of the phase signal from the control system 220 and detection of the second projection by the control system 620 can be used to determine the phase of the propeller 630 with respect to the propeller 130. The control system 620 can then determine necessary changes to the operating parameters of the engines 110, 610 and/or to the propellers 130, 630 to maintain or achieve synchrophasing for the propellers 130, 630. For example, if the propellers 130, 630 are out-of-phase with one another by a level that is above a predetermined threshold, the control system 620 can generate instructions for causing changes to the rotational velocity of one or both of the engines 110, 610 and/or the propellers 130, 630, in the form of the aforementioned engine control signals, and transmit the engine control signals to the control system 220, as appropriate, or directly apply the changes to the engine 610 and/or to the propeller 630. In other examples, the central control 650 can generate instructions for causing changes to other operating parameters of any one or more of the engine 110, the engine 610, the propeller 130, and/or the propeller 630, for example a propeller blade angle, a propeller pitch, a torque, an output power, and the like. In another example, the control system 220 can be configured to carry out these operations instead of the control system 620.

In addition, in some embodiments the control systems 220, 620 operate collaboratively: for instance, both control systems 220, 620 can transmit a position and/or phase signal to the other control system 220, 620, and adjustments to be made to the operating parameters of the engines 110, 610 and/or the propellers 130, 630 can be determined collaboratively by both control systems 220, 620, for instance by exchanging one or more proposals for adjustments. In other embodiments, a particular one of the control systems 220, 620 can be a "primary" control system, and the other a "secondary" control system, and the primary can dictate changes for both engines 110, 610 and/or both propellers 130, 630, as disclosed hereinabove.

It should be noted that although the examples of FIGS. 6A-B discussed hereinabove pertain to the multi-engine aircraft 600 having two engines 110, 610 and two propellers 130, 630, other embodiments of the aircraft 600 are also considered, including embodiments in which the aircraft 600 has three, four, six, eight, ten, twelve, or any other suitable number of engines, and any suitable number of propellers.

Figure 7:
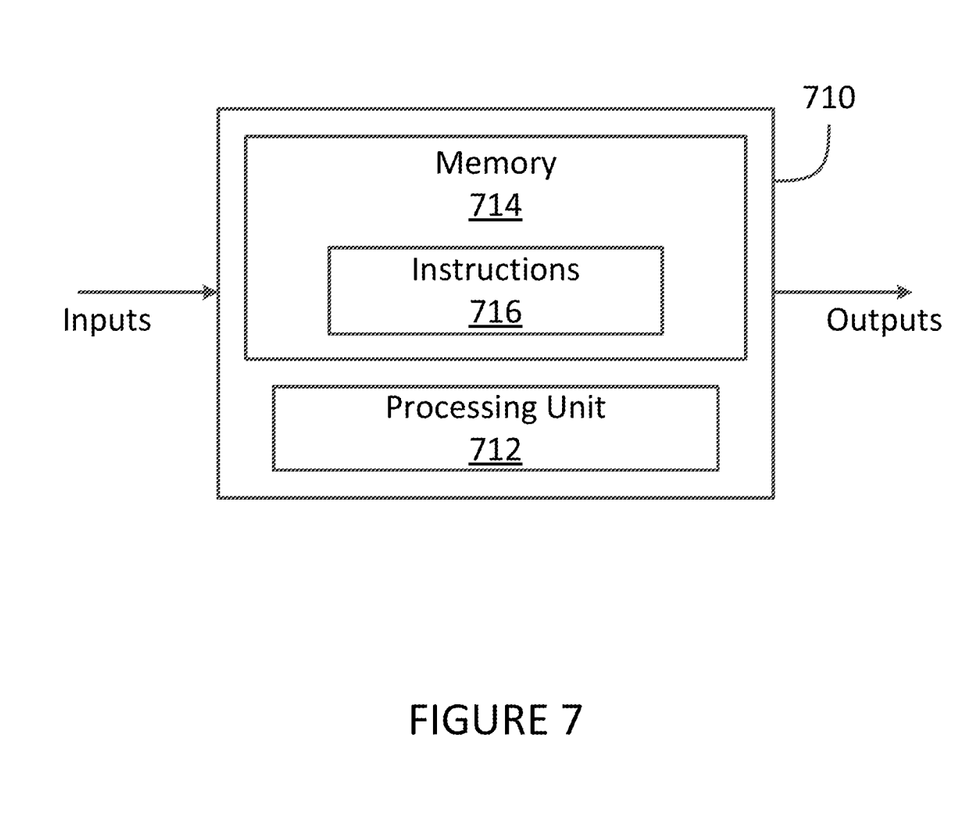
FIG. 7 is a block diagram of an example computer system for implementing part or all of the method of FIG. 5.

With reference to FIG. 7, the control systems 220, 620 may be embodied by a computing device 710 configured for implementing the method 500. The computing device 710 comprises a processing unit 712 and a memory 714 which has stored therein computer-executable instructions 716. The processing unit 712 may comprise any suitable devices configured to implement the method 500 such that instructions 716, when executed by the computing device 710 or other programmable apparatus, may cause the functions/acts/steps performed as part of the method 500 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

It should be noted that the computing device 710 may be implemented as part of a FADEC or other similar device, including electronic engine control (EEC), engine control unit (EUC), and the like. In addition, it should be noted that the method 500 and, more generally, the techniques described herein can be performed substantially in real-time, during operation of the engines 110, 610. For example, if the engines 110, 160 are used as part of the multi-engine aircraft 600, the monitoring of the engines 110, 610 by the control systems 220, 620 can be performed in real-time during a flight mission.

The systems and methods described herein may be implemented in a high level procedural or object oriented programming or scripting language, or a combination thereof, to communicate with or assist in the operation of a computer system, for example the computing device 710. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 712 of the computing device 710, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A system for synchrophasing a multi-engine aircraft, comprising:
   a phonic wheel coupled to a first propeller of a first engine of the aircraft, the phonic wheel comprising a plurality of circumferentially uniformly-spaced first position markers disposed on an outer circumferential surface of the phonic wheel and a second position marker disposed on the outer surface, the second position marker disposed circumferentially closer to a selected one of the first position markers than to the remaining first position markers and being indicative of a reference position of the propeller, the phonic wheel configured to rotate during operation of the first engine;
   a sensor adjacent the phonic wheel and configured for producing a signal in response to passage of the first position markers and the second position marker, the signal comprising a plurality of signal pulses corresponding to the passage of the plurality of first position markers and of the second position marker during rotation of the phonic wheel; and
   a control system communicatively coupled to the sensor for obtaining the signal, and configured for:
      determining, based on the plurality of signal pulses, an expected delay between two subsequent pulses of the plurality of signal pulses, the expected delay representative of the spacing of the plurality of first position markers;
      identifying from within the plurality of signal pulses a particular pulse associated with the second position marker, the particular pulse having a delay shorter than the expected delay;
      determining, based on a particular time at which the particular pulse associated with the second position marker was produced, that a rotational position of the first propeller corresponds to the reference position at the particular time; and
      performing at least one synchrophasing operation for the aircraft based on the rotational position of the first propeller.

2. The system of claim 1, wherein the control system being configured for performing at least one synchrophasing operation comprises:
   transmitting a position signal, indicative of the rotational position of the first propeller, to a central control of the aircraft;
   obtaining, from the central control, an engine control signal generated by the central control based on the position signal, the engine control signal comprising instructions for causing a predetermined operating parameter of at least one of the first engine and the first propeller to be adjusted to maintain a predetermined phase angle for the first propeller; and
   adjusting, based on the engine control signal, at least one operating parameter of the at least one of the first engine and the first propeller.

3. The system of claim 2, wherein transmitting the position signal, indicative of the rotational position of the first propeller, to the central control of the aircraft further causes the central control to generate, based on the position signal, instructions for causing a predetermined operating parameter of at least one of a second engine and a second propeller of the aircraft to be adjusted to maintain a predetermined phase angle difference between the first propeller and the second propeller.

4. The system of claim 1, wherein the control system is a first control system, wherein the first control system being configured for performing at least one synchrophasing operation comprises:
transmitting a position signal to a second control system associated with a second propeller of the aircraft;
obtaining, from the second control system, an engine control signal generated by the second control system based on the position signal, the engine control signal comprising instructions for causing a predetermined operating parameter of at least one of the first engine and the first propeller to be adjusted to maintain a predetermined phase angle for the first propeller; and
adjusting, based on the engine control signal, the predetermined operating parameter of the at least one of the first engine and the first propeller.

5. The system of claim 4, wherein transmitting the position signal, indicative of the rotational position of the first propeller, to the second control system further causes the second control system to generate, based on the position signal, instructions for causing a predetermined operating parameter of at least one of a second engine and a second propeller of the aircraft to be adjusted to maintain a predetermined phase angle difference between the first propeller and the second propeller.

6. The system of claim 1, wherein the control system is further configured for:
obtaining at least one position signal from at least one supplementary control system, each of the at least one supplementary control system associated with a respective supplementary engine and supplementary propeller of the aircraft and each of the at least one position signal indicative of a rotational position of the respective supplementary propeller of the aircraft;
generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and
transmitting each of the at least one engine control signal to the respective supplementary control system.

7. The system of claim 1, wherein the control system is further configured for:
obtaining at least one position signal from at least one supplementary control system, each of the at least one supplementary control system associated with a respective supplementary engine and supplementary propeller of the aircraft and each of the at least one position signals indicative of a rotational position of the respective supplementary propeller of the aircraft; and
adjusting a predetermined operating parameter of at least one of the first engine and the first propeller to maintain a predetermined phase angle difference between the first propeller and the at least one supplementary propeller.

8. The system of claim 7, wherein the control system is further configured for:
generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and
transmitting each of the at least one engine control signal to the respective supplementary control system.

9. The system of claim 1, wherein the at least one synchrophasing operation comprises at least one of adjusting a speed of rotation of the first engine, a speed of rotation of the first propeller, and a pitch of the first propeller.

10. The system of claim 1, wherein the second position marker is angled with respect to the first position markers.

11. The system of claim 1, wherein the second position marker is angled with respect to the position markers of the first plurality of position markers.

12. A method for performing synchrophasing in a multi-engine aircraft, comprising:
obtaining a signal, comprising a plurality of signal pulses, from a sensor adjacent a phonic wheel, the plurality of signal pulses produced in response to sensing a presence of position markers disposed on an outer surface of the phonic wheel coupled to a first propeller of a first engine of the aircraft, the phonic wheel configured to rotate during operation of the first engine;
determining, based on the plurality of signal pulses, an expected delay between two subsequent signal pulses of the plurality of signal pulses, the expected delay representative of a spacing of a first plurality of the position markers;
identifying, within the plurality of signal pulses and based on the expected delay, a particular pulse associated with a second one of the position markers;
determining, based on a particular time at which the particular pulse associated with the second position marker was produced, that a rotational position of the first propeller corresponds to a reference position of the first propeller associated with the second position marker at the particular time; and
performing at least one synchrophasing operation for the engine based on the rotational position of the first propeller.

13. The method of claim 12, wherein performing at least one synchrophasing operation comprises:
transmitting a position signal, indicative of the rotational position of the first propeller, to a central control of the aircraft;
obtaining, from the central control, an engine control signal generated by the central control based on the position signal, the engine control signal comprising instructions for causing a predetermined operating parameter of at least one of the first engine and the first propeller to be adjusted to maintain a predetermined phase angle for the first propeller; and
adjusting, based on the engine control signal, at least one operating parameter of the at least one of the first engine and the first propeller.

14. The method of claim 13, wherein transmitting the position signal, indicative of the rotational position of the first propeller, to the central control of the aircraft further causes the central control to generate, based on the position signal, instructions for causing a predetermined operating parameter of at least one of a second engine and a second propeller of the aircraft to be adjusted to maintain a predetermined phase angle difference between the first propeller and the second propeller.

15. The method of claim 12, wherein performing at least one synchrophasing operation comprises:
   transmitting a position signal to a second control system associated with a second propeller of the aircraft;
   obtaining, from the second control system, an engine control signal generated by the second control system based on the position signal, the engine control signal comprising instructions for causing a predetermined operating parameter of at least one of the first engine and the first propeller to be adjusted to maintain a predetermined phase angle for the first propeller; and
   adjusting, based on the engine control signal, the predetermined operating parameter of the at least one of the first engine and the first propeller.

16. The method of claim 15, wherein transmitting the position signal, indicative of the rotational position of the first propeller, to the second control system further causes the second control system to generate, based on the position signal, instructions for causing a predetermined operating parameter of at least one of a second engine and a second propeller of the aircraft to be adjusted to maintain a predetermined phase angle difference between the first propeller and the second propeller.

17. The method of claim 12, further comprising:
   obtaining at least one position signal from at least one supplementary control system, each of the at least one supplementary control system associated with a respective supplementary engine and supplementary propeller of the aircraft and each of the at least one position signal indicative of a rotational position of the respective supplementary propeller of the aircraft;
   generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and
   transmitting each of the at least one engine control signal to the respective supplementary control system.

18. The method of claim 12, further comprising:
   obtaining at least one position signal from at least one supplementary control system, each of the at least one supplementary control system associated with a respective supplementary engine and supplementary propeller of the aircraft and each of the at least one position signals indicative of a rotational position of the respective supplementary propeller of the aircraft; and
   adjusting a predetermined operating parameter of at least one of the first engine and the first propeller to maintain a predetermined phase angle difference between the first propeller and the at least one supplementary propeller.

19. The method of claim 18, further comprising:
   generating at least one engine control signal based on the at least one position signal, the at least one engine control signal comprising instructions for causing a respective predetermined operating parameter of at least one of each supplementary engine and each supplementary propeller to be adjusted to maintain a predetermined phase angle difference between the first propeller and the at least one supplementary propeller; and
   transmitting each of the at least one engine control signal to the respective supplementary control system.

20. The method of claim 12, wherein performing the at least one synchrophasing operation comprises performing at least one of adjusting a speed of rotation of the first engine, a speed of rotation of the first propeller, and a pitch of the first propeller.

* * * * *